(12) United States Patent
Buring et al.

(10) Patent No.: US 6,702,351 B2
(45) Date of Patent: Mar. 9, 2004

(54) MOBILE MULTI-DISPLAY BILLBOARD VEHICLE AND METHOD OF ADVERTIZING

(75) Inventors: David Buring, 5951 Brierhaven Ave., Memphis, TN (US) 38120; Steve Blankenship, Pocahontas, TN (US)

(73) Assignee: David Buring, Memphis, TN (US)

( * ) Notice: Subject to any disclaimer, the term of this patent is extended or adjusted under 35 U.S.C. 154(b) by 11 days.

(21) Appl. No.: 10/061,461

(22) Filed: Mar. 25, 2002

(65) Prior Publication Data

US 2003/0178867 A1 Sep. 25, 2003

(51) Int. Cl.$^7$ ................................................ B60R 13/00
(52) U.S. Cl. ........................................... 296/21; 40/591
(58) Field of Search ............................... 296/21; 40/590, 40/591, 545, 502, 473, 493; 362/80

(56) References Cited

U.S. PATENT DOCUMENTS

| | | | |
|---|---|---|---|
| 369,305 A | 8/1887 | Vogel et al. | |
| 676,235 A | 6/1901 | Jackson | |
| 2,077,585 A | 4/1937 | Rivers | 40/129 |
| 3,135,063 A | 6/1964 | Ricks | 40/137 |
| 4,189,859 A | 2/1980 | Ahlgren | 40/505 |
| 4,528,763 A | 7/1985 | Ahlgren | 40/505 |
| 5,003,716 A | 4/1991 | Dyar | 40/503 |
| 5,083,826 A | 1/1992 | McCrary | 296/21 |
| 5,233,772 A | 8/1993 | Bergeron et al. | 40/503 |
| 5,255,465 A | 10/1993 | Perez | 40/505 |
| 5,315,776 A | 5/1994 | Strawbridge et al. | 40/505 |
| 5,343,645 A | 9/1994 | Huber | 40/505 |
| 5,416,996 A | 5/1995 | Clemens et al. | 40/502 |
| 5,507,109 A | 4/1996 | Rinzler | 40/603 |
| 5,511,330 A | 4/1996 | Havens | 40/505 |
| 5,692,330 A | 12/1997 | Anderson, Jr. | 40/505 |
| 5,737,861 A | 4/1998 | Hansen | 40/505 |
| 5,918,924 A | 7/1999 | Cowan | 296/21 |
| 6,076,293 A | 6/2000 | Bergeron | 40/503 |
| 6,122,850 A | 9/2000 | Strzeletz | 40/591 |
| 6,128,841 A | 10/2000 | Werner | 40/505 |
| 6,178,675 B1 | 1/2001 | Strother | 40/503 |
| 6,256,912 B1 | 7/2001 | Gibson et al. | 40/503 |

*Primary Examiner*—Joseph D. Pape
(74) *Attorney, Agent, or Firm*—Thomas, Kayden, Horstemeyer & Risley, LLP (57) ABSTRACT

Mobile multi-display billboard vehicles are provided. A representative vehicle includes a cab and a bed portion, and at least one multi-display sign box. Methods and other systems are also provided.

35 Claims, 8 Drawing Sheets

MOBILE MULTI-DISPLAY BILLBOARD VEHICLE AND METHOD OF ADVERTIZING

TECHICAL FIELD

The present invention generally relates to mobile advertising. More particularly, the invention relates to a vehicle that is capable of displaying multiple advertisements on an alternating basis.

BACKGROUND OF THE ART

It has long been customary for businesses and merchants to display their store name, company name, selected promotional message, etc., on the vehicles used in conducting their businesses. This makes sense from the standpoint that any surface visible to the consuming public could prove to be a valuable advertising tool. For example, in the process of delivering goods, a business' vehicle is not only seen by those purchasing their products, but also by all those people located along the path the vehicle travels during the delivery.

Although advertising on one's own business vehicles has the advantages discussed above, there are also a number of disadvantages inherent in this method. Advertising on vehicles actually used in the course of business limits the use of the vehicle for the purpose of advertising to those routes dictated by regular operations. These routes, although necessary for the conduct of business, may not be the most advantageous routes for advertising. For example, a business owner may wish to advertise in an area where his vehicles are not required to regularly operate. As well, a business owner could decide it would be advantageous to advertise at various events, e.g., sporting events, auto races, concerts, where there is no reason to be operating a vehicle in the regular course of business. Moreover, it is likely to be advantageous to operate business vehicles during low traffic periods from an efficiency standpoint. This necessarily reduces the advertising value of the vehicle by lowering the number of potential customers to which the vehicle will be exposed.

Other potential limitations include the fact that advertisements on standard business vehicles are frequently not dynamic. The primary purpose of the vehicle is not to advertise, but to deliver goods, services, etc., and therefore the advertisement is often an afterthought. Finally, there are those businesses that, for whatever reason, do not operate their own vehicles. For instance, some businesses are not large enough to warrant operating their own vehicles and, therefore, utilize trucking services, or they do not provide goods and services that require the use of vehicles. As such, they do not have access to mobile advertising.

From the foregoing, it can be appreciated that there is a need for improved systems and methods that address the aforementioned and/or other shortcomings of the prior art.

SUMMARY OF THE INVENTION

The present invention provides systems and methods for mobile multi-display billboard advertising.

Briefly described, the system includes a vehicle with a bed portion, and at least one multi-display sign box attached to the bed portion.

The present invention can also be viewed as providing a method for mobile advertising. In this regard, the method can be broadly summarized by providing a vehicle having at least one multi-display sign box attached to a bed portion of the vehicle, and operating the vehicle in various locations.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The mobile multi-display billboard vehicle can be better understood with reference to the following drawings. The components in the drawings are not necessarily to scale, emphasis instead being placed upon clearly illustrating the principles of the mobile multi-display billboard vehicle. Moreover, in the drawings, like reference numerals designate corresponding parts throughout the several views.

Reference will now be made in detail to the description of the mobile multi-display billboard vehicle as illustrated in the drawings. While the mobile multi-display billboard vehicle will be described in connection with these drawings, there is no intent to limit it to the embodiment or embodiments disclosed therein. On the contrary, the intent is to cover all alternatives, modifications and equivalents included within the spirit and scope of the mobile multi-display billboard vehicle as defined by the appended claims.

DETAILED DESCRIPTION OF THE PREFERRED EMBODIMENT

Embodiments of the present invention involve the use of multi-display sign boxes that are attached to vehicles. As such, the sign boxes can be moved, as desired, to various locations. Moreover, the sign boxes are preferably of the variety that allows multiple signs, advertisements, informational displays, etc., to be selectively displayed on an alternating basis.

Figure 1:
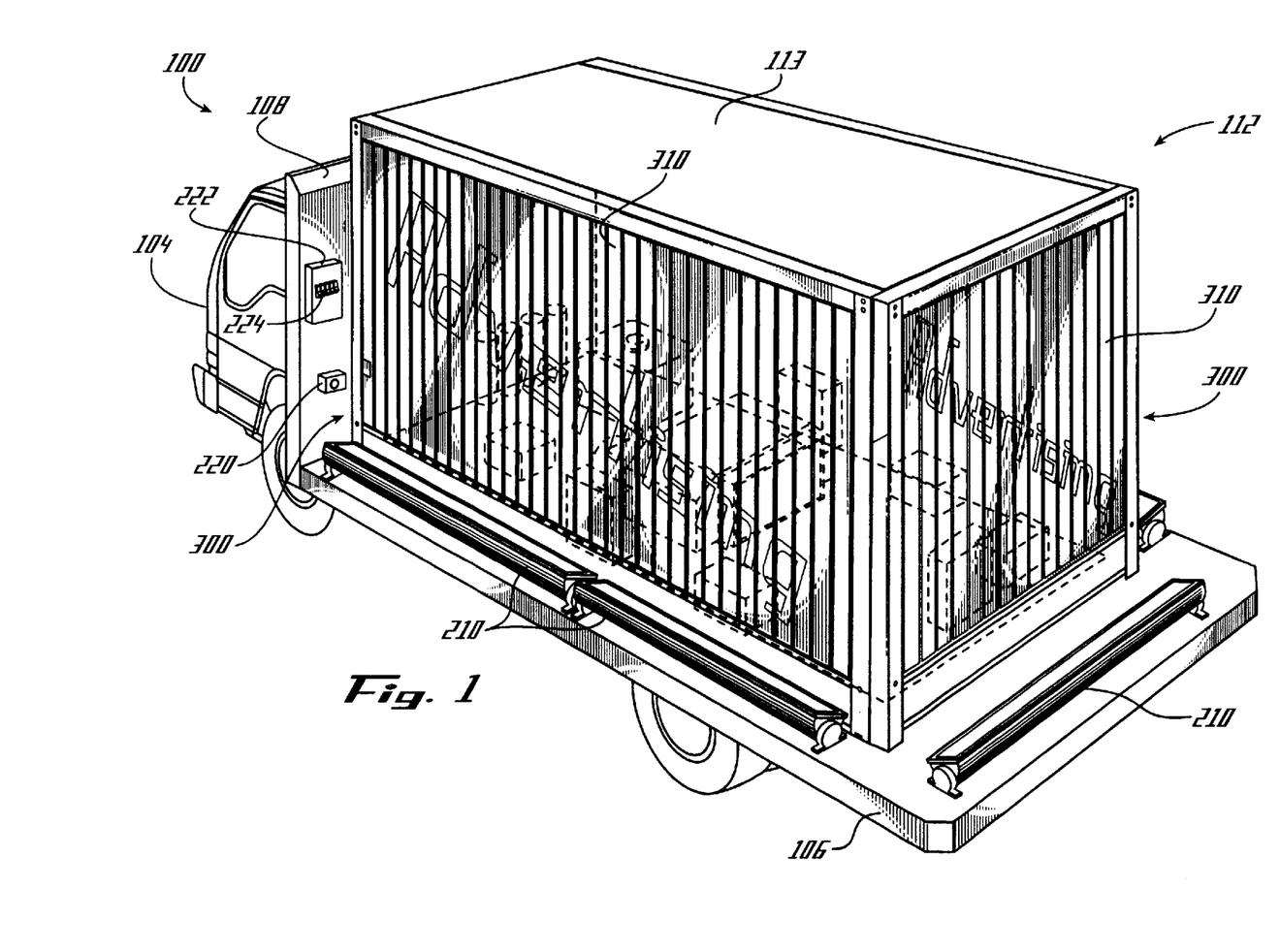
FIG. 1 is a top, side perspective view of an embodiment of the mobile multi-display billboard vehicle.

Referring now in more detail to the drawings, FIG. 1 illustrates an embodiment of a mobile multi-display billboard vehicle 100, hereinafter "billboard vehicle" 100, including a cab 104 and a bed portion 106. As shown, three multi-display sign boxes 300 are mounted on the bed portion 106 so that an enclosure 112 is formed. However, the invention can include varying numbers of multi-display sign boxes 300. For example, two side multi-display sign boxes may be used and the rear multi-display sign box replaced with a rear wall (not shown).

Preferably, the multi-display sign boxes 300 are of a multi-sided display variety, thereby enabling each multi-display sign box 300 to display more than one advertisement. Quite frequently, bed portions 106 of vehicles include a forward wall 108 to protect the cab 104 from the load being carried on the bed portion 106. The forward wall 108 can be used to form part of the enclosure 112. By forming an enclosure 112 with the multi-display sign boxes 300, those components required to operate the multi-display sign boxes 300 can be hidden from view. To further hide the internal components from view, each multi-display sign box 300 can include a liner 301 (FIG. 2) disposed on the backside of the multi-display sign box 300. The liner 301 prevents someone viewing the advertisements from being able to see the components inside the enclosure 112 through the spaces between the display elements 310. As well, the enclosure 112 serves to protect the components from the elements. As such, a roof 113 is provided. Note, the multi-display sign boxes 300 need not form a box-like structure where the multi-display sign boxes 300 are perpendicular to one another at the corners of the enclosure 112. For example, the opposing multi-display sign boxes 300 could be angled relative to the centerline of the bed portion 106.

Figure 2:
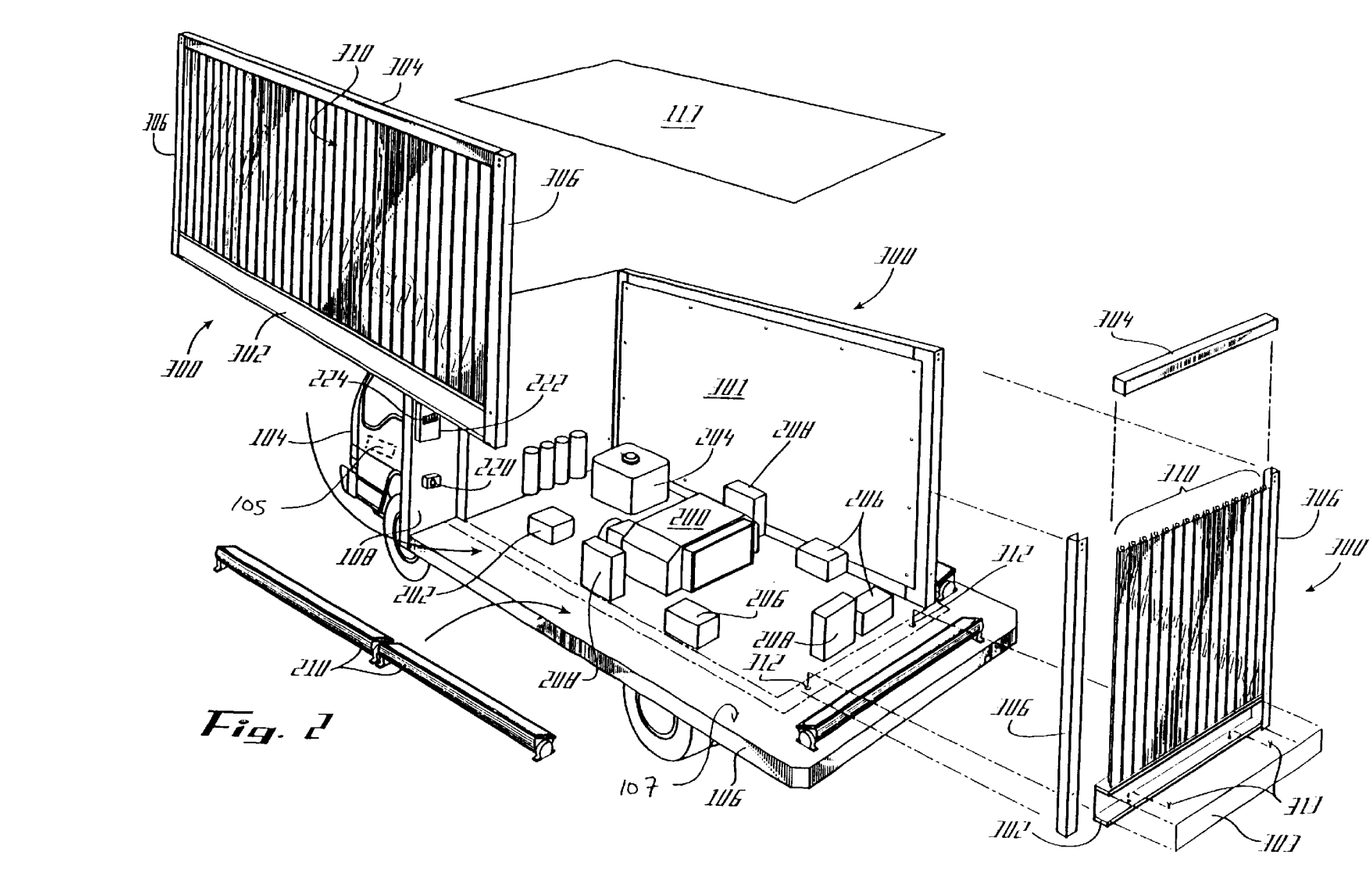
FIG. 2 is a top, side, partially exploded, perspective view of the mobile multi-display billboard vehicle shown in FIG. 1.

Referring now to FIG. 2, those components housed within the enclosure 112 will be discussed. A diesel generator 200 is utilized to provide power for the operation of the multi-display sign boxes 300. The diesel generator 200 is mounted to the bed portion 106 and receives starting power from batteries (not shown) housed within a battery box 202. Once started, the diesel generator receives fuel from a fuel tank 204 mounted to the bed portion 106. If desired, the diesel generator 200 can be configured to exhaust through a passage in the bed portion 106.

Once operating, power from the diesel generator 200 is routed to one or more motors 206. Ideally, one motor 206 is provided for each of the multi-display sign boxes 300. In this manner, each multi-display sign box 300 can be operated independently of the other multi-display sign boxes 300. Further, each motor 206 receives operating signals from a controller 208, such as a computer, timing device, etc. The controller 208 is used to determine the frequency at which the multi-display sign boxes 300 are operated, thereby displaying the varying advertisements. Ideally, the period of time each advertisement is displayed can be selected independently for each of the multi-display sign boxes 300. For ease of construction and redundancy, each multi-display sign box 300 has its own controller 208 housed separately and communicatively coupled to the respective motor 206. However, a single centrally located control system can be utilized.

Lighting fixtures 210 are provided for illuminating the multi-display sign boxes 300. Ideally, each multi-display sign box 300 has one or more lighting fixtures 210 dedicated solely to illuminating that multi-display sign box 300. Although lighting fixtures 210 are not necessarily required, they enhance the operation and efficiency of the present billboard vehicle by both allowing the system to be used at night and enhancing the appearance of the advertisements on the multi-display sign boxes 300. Any number of available devices are sufficient for use as lighting fixtures 210, for example, fluorescent lamps, incandescent lamps, halogen flood lamps, etc. The lighting fixtures 210 can be mounted directly to the bed portion 106, and like the multi-display sign boxes 300, are powered by the diesel generator 200.

A diesel start button 220 is provided in a location remote from the diesel generator 200. This allows operator to start the diesel generator 200 without having to remove any of the display elements 310 to gain access. A breaker box 222 is also provided that includes a switch 224 for each of the multi-display sign boxes 300, thereby allowing the multi-display sign boxes 300 to be operated independently of each other. As shown, both the diesel start button 220 and the breaker box 222 are disposed on the forward wall 108 of the bed portion 106. However, the diesel start button 220 and breaker box 222 can both be mounted inside the cab 104, thereby allowing the billboard vehicle to be operated without having to leave the cab 104. Operation of the lighting fixtures 210 through the breaker box 222 may also be desirable.

Figure 3:
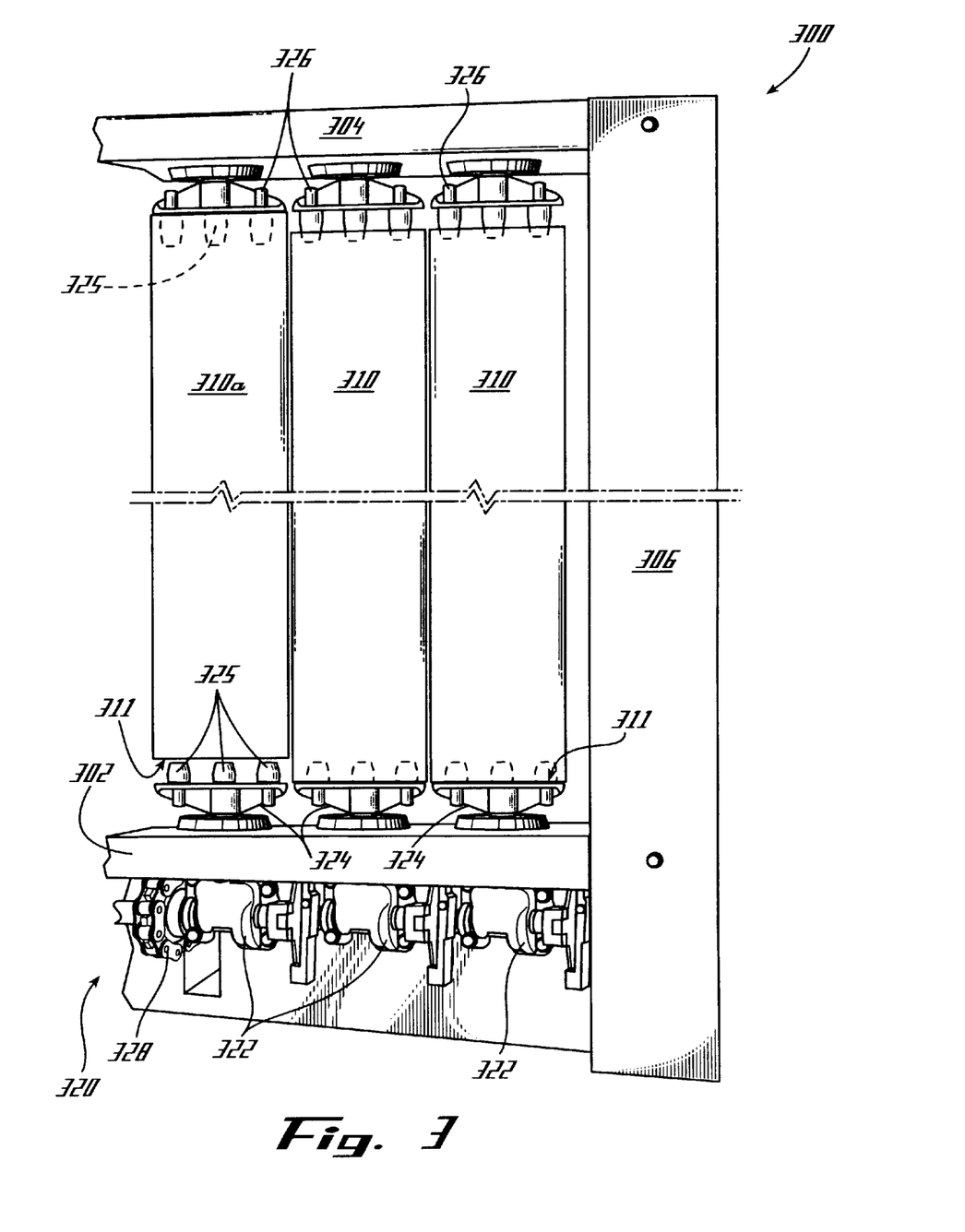
FIG. 3 is a partial perspective view of a portion of a multi-display sign box as shown in FIGS. 1 and 2.

A multi-display sign box 300 of the triangular display variety is shown. Each multi-display sign box 300 consists of a lower frame member 302, an upper frame member 304, a pair of end frame members 306, a plurality of triangular display elements 310, and a drive mechanism 320 (FIG. 3). Preferably, the multi-display sign boxes 300 are attached to the upper surface 107 of the bed portion 106 with bolts 313. The multi-display sign boxes 300 can be installed in pre-assembled fashion. However, for ease of construction, the lower frame members 302 are ideally mounted to the bed portion 106 prior to assembly of each multi-display sign box 300. First, the lower frame member 302 is placed in the desired position. After mounting holes 312 have been made in the bed portion 106, the lower frame member 302 is secured to the bed portion 106 with at least one attaching device, such as a bolt 313 a stud, a rivet, etc. Next, the end frame members 306 are attached to the lower frame member 302. Finally, the upper frame member 304 is attached to the two end frame members 306, thereby completing the frame assembly of the multi-display sign box 300.

Referring now to FIG. 3, once the frame assembly of the multi-display sign box 300 is assembled, the plurality of the triangular display elements 310 are placed in position. The lower frame member 302 houses a drive mechanism 320. The lower frame member 302 is shown without the cover plate 303 (FIG. 2) in place in order to better describe the drive mechanism 320. As shown, the drive mechanism 320 includes a plurality of gear elements 322, each gear element 322 including a lower seat 324 upon which a triangular display element 310 is seated. The upper frame member 304 includes a plurality of upper seats 326 which hold the triangular display elements 310 in position on the lower seats. The distance between the upper seats 326 and lower seats 324 is such that the triangular display elements 310 can be removed by lifting upwardly on the element such that the element slides over the upper seat 326 until the bottom edge 311 clears the retention fingers 325 (step shown by display element 310*a*). The triangular display element 310 is then removed by swinging the bottom edge 311 clear of the lower seat 324. This operation remains the same regardless of whether the drive mechanism 320 is housed within the lower frame member 302 or upper frame member 304. The embodiment shown includes the drive mechanism 320 housed within the lower frame member 302 for ease of access. The chain 328 operatively connects the motor (not shown) to the drive mechanism 320, allowing the motor to rotate the plurality of triangular display elements 310 between three positions displaying three individual advertisements.

As well, one embodiment of the billboard vehicle 100 includes a low power FM transmitter 105 (FIG. 2). Numerous low-power FM transmitters are available on the market, one such example being the SKY-2000 Digital FM Transmitter, marketed by Target Marketing, Inc. Ideally, the low power FM transmitter 105 is mounted in the cab 104, thereby facilitating operation and maintenance of the transmitter. The low power FM transmitter 105 allows the user of the billboard vehicle 100 to broadcast messages and additional information pertaining to the advertisements displayed on the multi-display sign boxes 300. As well, messages related to securing the services of the billboard vehicle 100 can also be broadcast using the low power FM transmitter 105.

Figure 4:
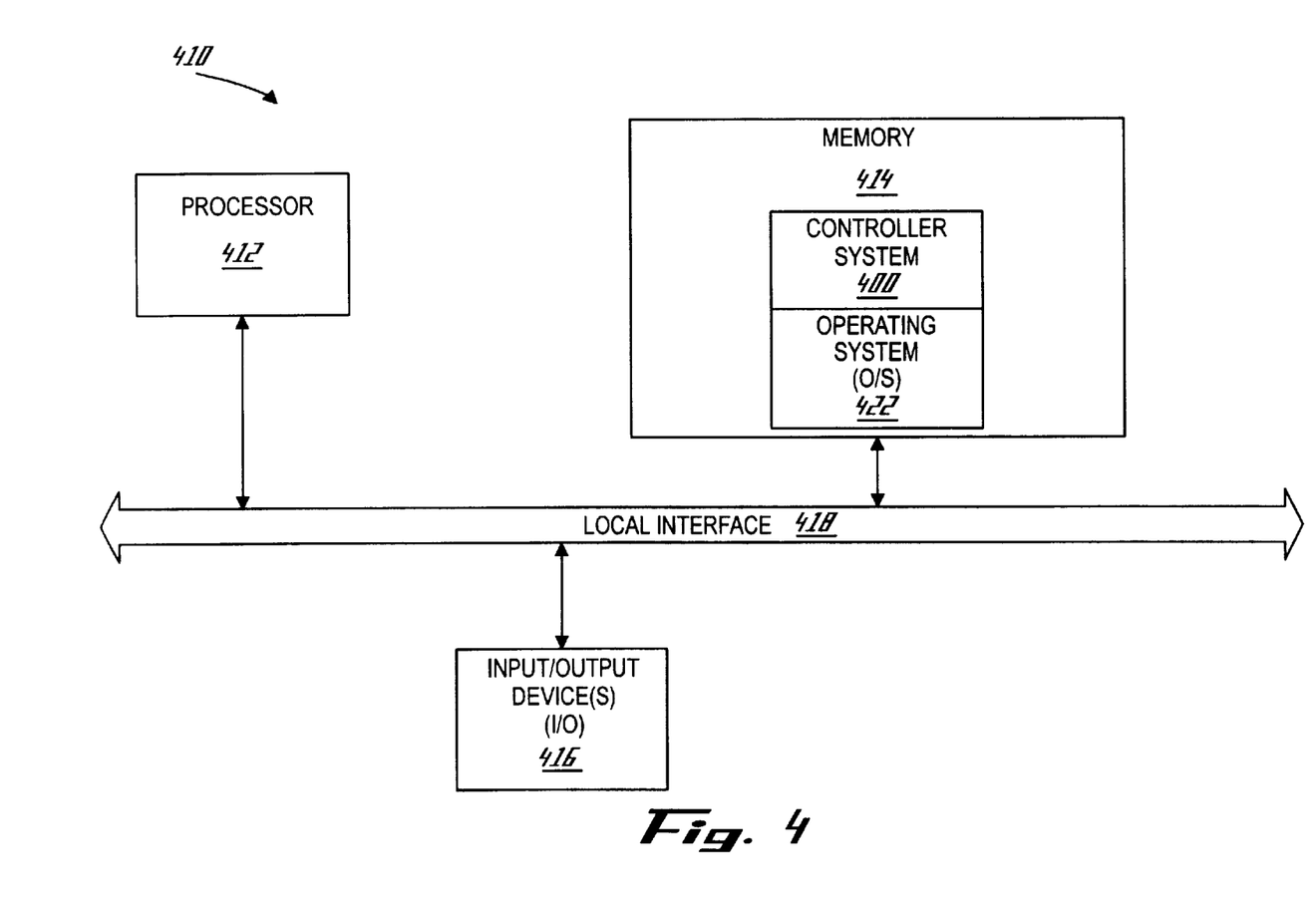
FIG. 4 is a block diagram showing an embodiment of the controller system of the present invention.

As previously noted, the frequency at which the multi-display sign boxes 300 are operated can be varied. The controller system of the invention can be implemented in software (e.g., firmware), hardware, or a combination thereof. The system can be implemented in software, as an executable program, and executed by a special or general purpose digital computer, such as a personal computer (PC; IBM-compatible, Apple-compatible, or otherwise), workstation, minicomputer, or mainframe computer. In a preferred embodiment, the system is executed by a general purpose computer named the Series IV Smartboard, produced by Action Graphics. An example of a general purpose computer that can implement the controller system of the present invention is shown in FIG. 4. In FIG. 4, the controller system is denoted by reference numeral 400.

Generally, in terms of hardware architecture, as shown in FIG. 4, the computer 410 includes a processor 412, memory 414, and one or more input and/or output (I/O) devices 416 (or peripherals) that are communicatively coupled via a local interface 418. The local interface 418 can be, for example but not limited to, one or more buses or other wired or wireless connections, as is known in the art. The local interface 418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 412 is a hardware device for executing software, particularly that stored in memory 414. The processor 412 can be any custom made or commercially available processor, a central processing unit (CPU), an auxiliary processor among several processors associated with the computer 410, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 414 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 414 may incorporate electronic, magnetic, optical, and/or other types of storage media. Note that the memory 414 can have a distributed architecture, where various components are situated remote from one another, but can be accessed by the processor 412.

The software in memory 414 may include one or more separate programs, each of which comprises an ordered listing of executable instructions for implementing logical functions. In the example of FIG. 4, the software in the memory 414 includes the controller system in accordance with the present invention and a suitable operating system (O/S) 422. A nonexhaustive list of examples of suitable commercially available operating systems 422 is as follows:

(a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 422 essentially controls the execution of other computer programs, such as the controller system 400, and provides scheduling, input-output control, file and data management, memory management, and communication control and related services.

The controller system 400 is a source program, executable program (object code), script, or any other entity comprising a set of instructions to be performed. When a source program, then the program needs to be translated via a compiler, assembler, interpreter, or the like, which may or may not be included within the memory 414, so as to operate properly in connection with the O/S 422. Furthermore, the controller system 400 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 416 may include input devices, for example but not limited to, a keyboard, mouse, scanner, microphone, etc. Furthermore, the I/O devices 416 may also include output devices, for example but not limited to, a printer, display, etc. Finally, the I/O devices 416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 410 is a PC, workstation, or the like, the software in the memory 414 may further include a basic input output system (BIOS) (omitted for simplicity). The BIOS is a set of essential software routines that initialize and test hardware at startup, start the O/S 422, and support the transfer of data among the hardware devices. The BIOS is stored in ROM so that the BIOS can be executed when the computer 410 is activated.

When the computer 410 is in operation, the processor 412 is configured to execute software stored within the memory 414, to communicate data to and from the memory 414, and to generally control operations of the computer 410 pursuant to the software. The controller system 400 and the O/S 422, in whole or in part, but typically the latter, are read by the processor 412, perhaps buffered within the processor 412, and then executed.

When the controller system 400 is implemented in software, as is shown in FIG. 4, it should be noted that the controller system 400 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The controller system 400 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the controller system 400 is implemented in hardware, the controller system can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
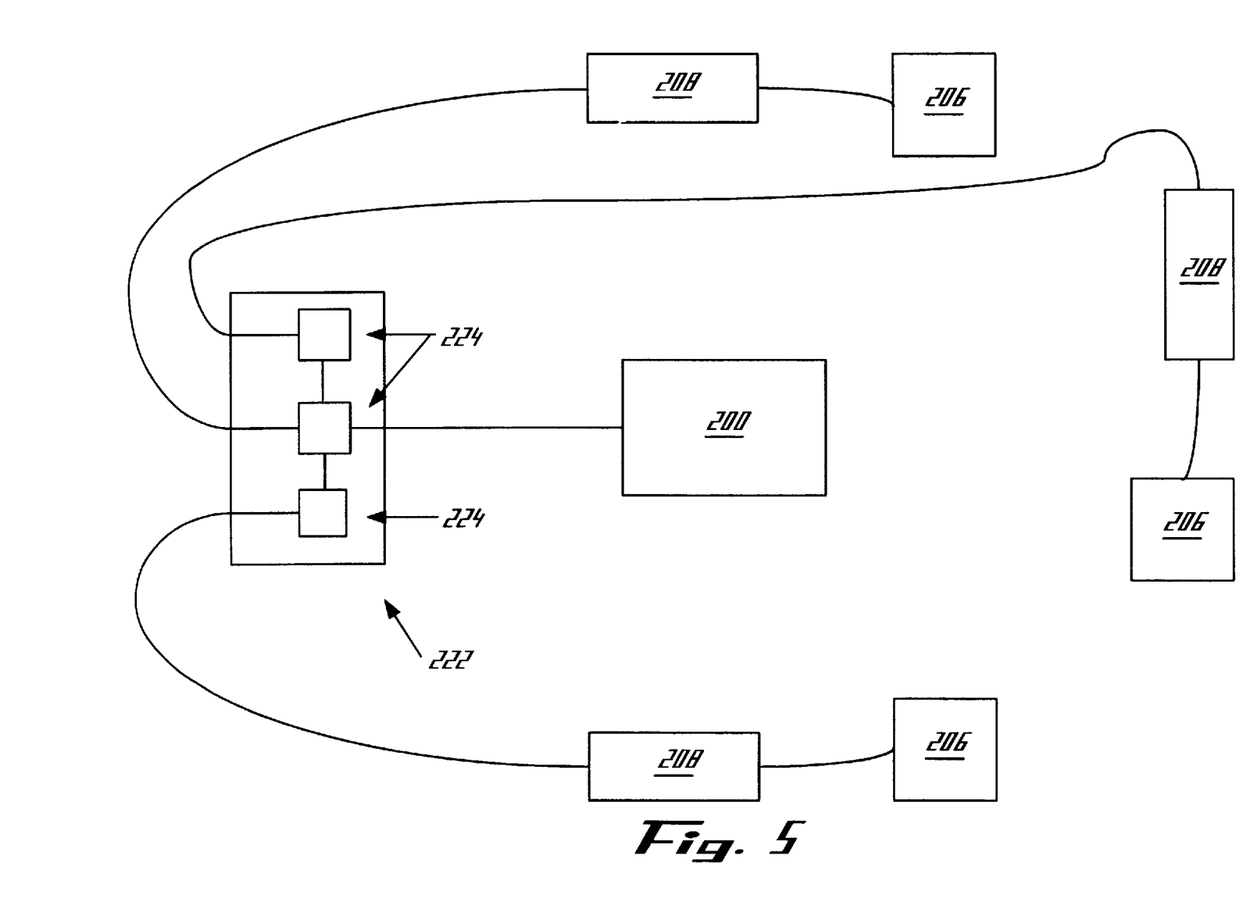
FIG. 5 is a schematic diagram showing various components of the mobile multi-display billboard vehicle.

Referring now to FIG. 5, the diesel generator 200 is preferably started by operating a remotely located diesel start button 220 (not shown). Once operating, the diesel generator provides the necessary power to operate the multi-display sign boxes 300 (FIGS. 1–3) of the present invention. Preferably, the diesel generator 200 is electrically connected to a breaker box 222 that includes a switch 224 for each of the multi-display sign boxes 300. This allows power running from the diesel generator 200 to be secured independently to each of the multi-display sign boxes 300.

As previously noted, it is preferable that the frequency at which each multi-display sign box 300 is operated can be controlled independently of the other multi-display sign boxes 300. As such, in a preferred embodiment, each multi-display sign box 300 is provided with its own controller 208 that receives power from the diesel generator 200 independently of the remaining controllers 208. Dependent upon the selected frequency of operation, each controller 208 intermittently allows power from the diesel generator 200 to pass to an associated motor 206, thereby resulting in the operation of the multi-display sign box 300. Preferably, the desired frequency for each controller can be adjusted remotely, such as from within the cab 104 (FIGS. 1 and 2).

Figure 6:
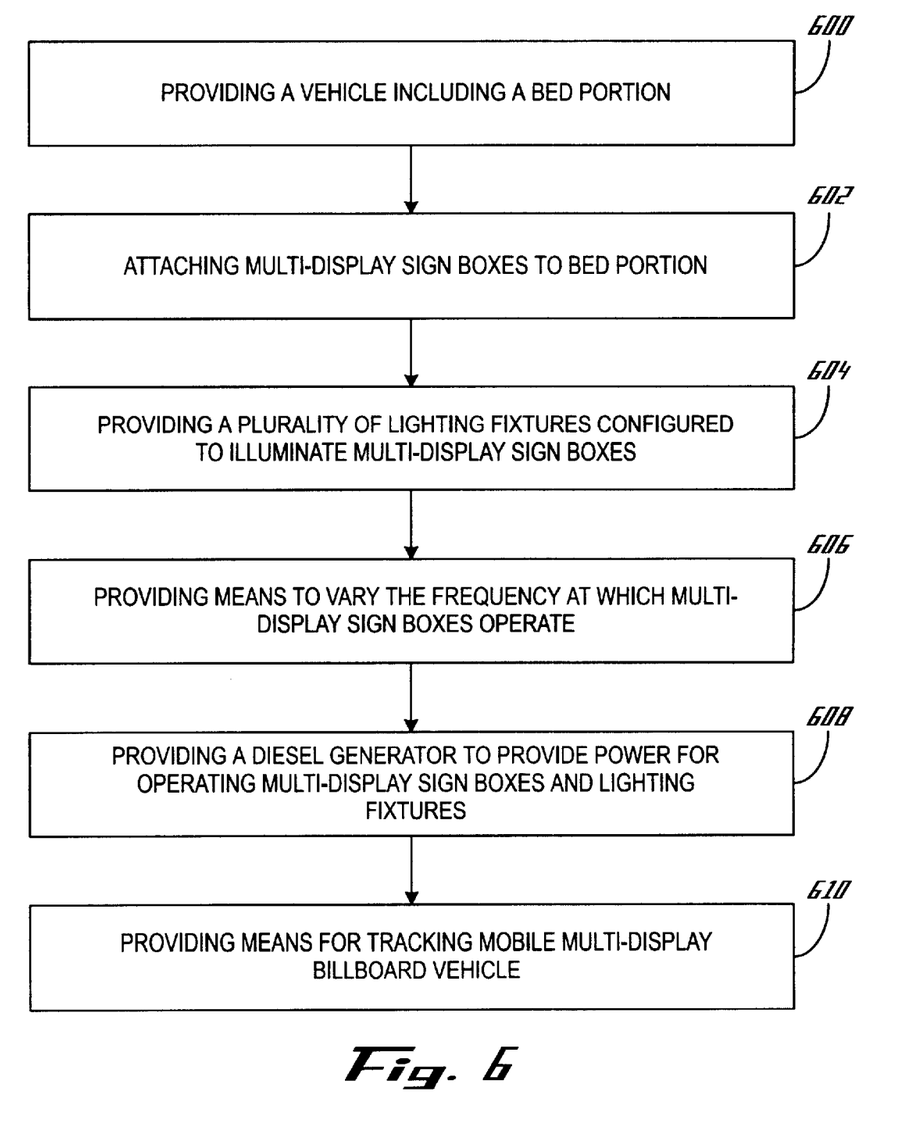
FIG. 6 is a flow chart showing an embodiment of a method of the present invention.

The flow chart of FIG. 6 shows a method of mobile advertising. First, a vehicle including a bed portion is provided, as shown in block 600. Next, as shown in block 602, a plurality of multi-display sign boxes are attached to the bed portion. To allow operation at night as well as make the advertisements, signs, etc., appear more dynamic, a plurality of lighting fixtures are provided for illuminating the multi-display sign boxes (box 604). To maximize efficiency of the billboard vehicles, means are provided that allow the frequency at which the multi-display sign boxes operate to be varied (box 606). As well, as shown in block 608, a diesel generator is provided to supply power for operating both the multi-display sign boxes and the lighting fixtures. Bolting is a preferred method of attaching the multi-display sign boxes to the bed portion (step 602) in that bolting is a relatively simple and expeditious operation. As well, bolting works well when a standard-sized metal flat bed portion (approximately 8 feet in width by 14 feet in length) is used with appropriately sized multi-display sign boxes (6 feet in height by 12 feet in length for side multi-display sign boxes, and 6 feet in height by 6 feet in length for rear multi-display sign boxes). Although not necessary, it may also prove beneficial to track the vehicle in order to determine where and when the vehicle is operating. As such, the step of providing a means for tracking the mobile multi-display billboard vehicle is shown in block 612. However, because this step is not required, block 612 is represented with a dotted line.

Figure 7:
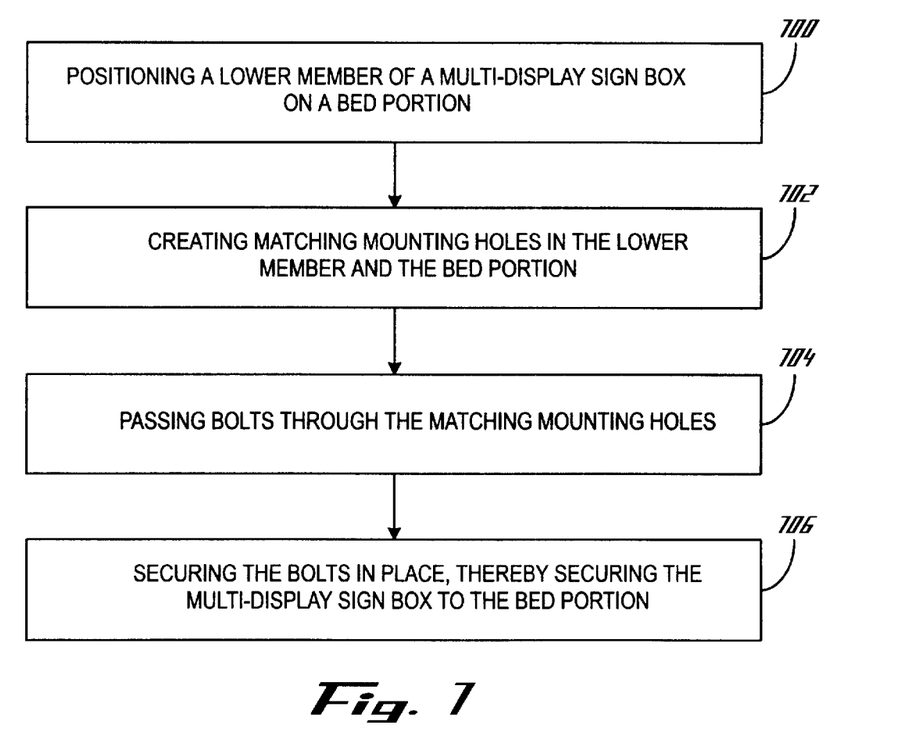
FIG. 7 is a flow chart showing an embodiment of a method of the present invention.

As shown in FIG. 7, the step of attaching the multi-display sign box to the bed portion (step 602 of FIG. 6) can further include positioning a lower member of a multi-display sign box on the flat bed portion (block 700) and creating matching mounting holes in the lower member and the bed portion (step 702). After the matching mounting holes are created, bolts are passed through the matching mounting holes (step 704) and secured in place, thereby securing the lower member, and hence the multi-display sign box, to the bed portion (step 706).

Figure 8:
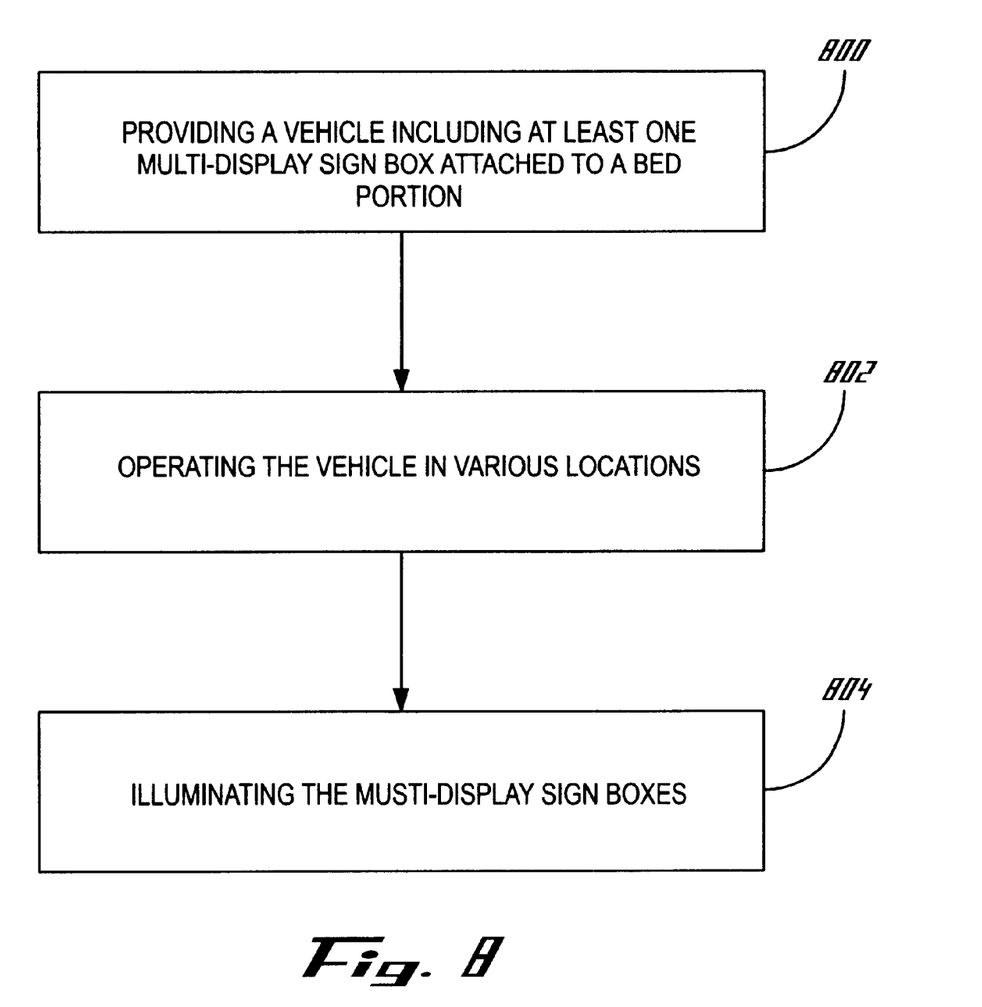
FIG. 8 is a flow chart showing an embodiment of a method of the present invention.

The flow chart of FIG. 8 shows a method of mobile advertising. As shown in block 800, a vehicle is provided including at least one multi-display sign attached to the bed portion. The vehicle is then operated at various locations (step 802), thereby enabling the advertisements displayed on the multi-display sign boxes to be viewed by numerous persons. Moreover, as shown in block 804, the multi-display sign boxes can be, but need not be, illuminated for operations any time of the day. Note that the vehicle, as referred to herein, is intended to encompass all forms of mobile conveyance, such as trucks, tractor trailers, cars, trailers, railroad cars, watercraft, etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A mobile multi-display billboard vehicle comprising:
 a vehicle including a cab and a flat bed portion including an upper surface;
 at least one multi-display sign box including a plurality of multi-sided display elements; and
 wherein said at least one multi-display sign box is attached to said upper surface of said flat bed portion.

2. The billboard vehicle of claim 1, further comprising attaching means for attaching said at least one multi-display sign box to said flat upper surface of said flat bed portion.

3. The billboard vehicle of claim 1, wherein each of said multi-display sign boxes further includes a front side, a back side, a lower frame member, an upper frame member, a pair of end frame members, and a drive mechanism for rotating said plurality of multi-sided display elements in tandem, said plurality of multi-sided display elements being vertically supported between said upper frame member and said lower frame member.

4. The billboard vehicle of claim 3, wherein each of said multi-display sign boxes further includes a liner disposed on said back side such that when viewed from said front side, vision between adjacent of said multi-sided display elements is prevented.

5. The billboard vehicle of claim 3, wherein said at least one multi-display sign box further includes a pair of opposing multi-display sign boxes and a rear multi-display sign box therebetween, wherein said lower frame members of said multi-display sign boxes are attached to said upper surface of said flat bed portion, and said end members of adjacent of said multi-display sign boxes are connected such that said multi-display sign boxes form an enclosure.

6. The billboard vehicle of claim 3, wherein said drive mechanism is at least partially disposed inside said lower frame member.

7. The billboard vehicle of claim 3, wherein each of said multi-display sign boxes is independently controlled such that said plurality of multi-sided display elements of each of said multi-display sign boxes is rotatable independent of other of said pluralities of multi-sided display elements of others of said multi-display sign boxes.

8. The billboard vehicle of claim 3, further including at least one lighting fixture mounted on said upper surface of said flat bed portion, said lighting fixture being configured to illuminate said at least one multi-display sign box.

9. The billboard vehicle of claim 8, further including a diesel generator secured to said flat bed portion and configured to supply operating power to said at least one multi-display sign box and said at least one lighting fixture.

10. The billboard vehicle of claim 3, wherein said multi-display sign boxes can be activated and deactivated from inside said cab.

11. The billboard vehicle of claim 7, wherein a frequency of rotation of said plurality of multi-sided display elements is variable.

12. The billboard vehicle of claim 1, further comprising a means for tracking a position of said vehicle.

13. The billboard vehicle of claim 1, further comprising a low power FM transmitter for transmitting advertising messages.

14. A method for advertising comprising:
providing a vehicle including a cab and a flat bed portion;
providing a plurality of multi-display sign boxes including a plurality of multi-sided display elements;
attaching said plurality of multi-display sign boxes to said flat bed portion of said vehicle;
positioning a lower member of each of said plurality of multi-display sign boxes on an upper surface of said flat bed portion;
creating matching mounting holes in said lower member and said flat bed portion;
passing at least one attaching means through said matching mounting holes; and
securing said at least one attaching means in place, thereby securing said lower member to said flat bed portion.

15. The method of claim 14, wherein said step of attaching said plurality of multi-display sign boxes to said flat bed portion further includes attaching a pair of opposing multi-display sign boxes and a rear multi-display sign box to said flat bed portion such that said plurality of multi-display sign boxes forms an enclosure.

16. The method of claim 14, further comprising the step of illuminating said plurality of multi-display sign boxes.

17. The method of claim 14, further comprising the step of operating each of said plurality of multi-display sign boxes independently of each other.

18. The method of claim 17, further comprising the step of varying a frequency at which each of said plurality of sign boxes operates.

19. The method of claim 14, further comprising the step of providing power for operating said plurality of multi-display sign boxes.

20. The method of claim 14, further comprising the step of transmitting low power FM advertising messages.

21. A method of advertising comprising:
providing a vehicle having a flat bed portion with an upper surface and at least one multi-display sign box bolted adjacent said upper surface of said flat bed portion thereof; and
operating said vehicle in a plurality of locations.

22. The method of claim 21, further comprising the step of illuminating said at least one multi-display sign box.

23. The method of claim 21, further comprising the step of transmitting low power FM advertising messages.

24. A mobile multi-display billboard vehicle comprising:
a vehicle including a cab and a flat bed portion;
a plurality of multi-display sign boxes each of said multi-display sign boxes bolted to said flat bed portion and including a plurality of multi-sided display elements;
a plurality of controllers, each of said controllers arranged and configured to operate one of said plurality of multi-display sign boxes at a desired frequency; and
wherein each of said plurality of multi-display sign boxes is operatively coupled to one of said plurality of controllers.

25. The mobile multi-display billboard vehicle of claim 24, wherein each of said controllers further includes a computer.

26. The mobile multi-display billboard vehicle of claim 24, wherein said desired frequency of each of said controllers is selected from inside said cab.

27. The mobile multi-display billboard vehicle of claim 24, further including three of said multi-display sign boxes and three of said controllers.

28. A mobile multi-display billboard vehicle comprising:
a vehicle having a cab and a bed portion;
a pair of opposing multi-display sign boxes and a rear multi-display sign box, each of said multi-display sign boxes including a front side, a back side, a lower frame member, an upper frame member, a pair of end frame members, a plurality of triangular display elements being vertically supported between said upper frame member and said lower frame member, a drive mechanism partially disposed in said lower frame member for rotating said plurality of triangular display elements in tandem, a motor configured to rotate said drive mechanism, and a controller configured to allow a frequency at which said plurality of triangular display elements is rotated to be varied;
a plurality of lighting fixtures being mounted to an upper surface of said bed portion and configured to illuminate said multi-display sign boxes;

a diesel generator attached to said bed portion being configured to supply operating power to said multi-display sign boxes and said plurality of lighting fixtures; and a plurality of switches in said cab configured to energize and de-energize each of said multi-display sign boxes independently of each other; and wherein said lower members of said multi-display sign boxes are mounted to said bed portion and said end members of adjacent of said multi-display sign boxes are rigidly connected such that said multi-display sign boxes form an enclosure, each of said multi-display sign boxes further including a liner disposed on said back side such that when viewed from said front side, vision between adjacent one of said triangular display elements is prevented.

29. A method for advertising with a vehicle including a cab with a flat bed portion and a plurality of multi-display sign boxes attached to the flat bed portion of said vehicle, comprising:

positioning a lower member of one of the plurality of multi-display sign boxes on the bed portion;

passing at least one attaching means through a pair of aligned mounting holes disposed one each on the lower member and the flat bed portion; and securing the at least one attaching means in place, thereby securing the lower member to the flat bed portion.

30. The method of claim 29, wherein the step of attaching the plurality of multi-display sign boxes to the flat bed portion further includes attaching a pair of opposing multi-display sign boxes and a rear multi-display sign box to the flat bed portion such that the plurality of multi-display sign boxes forms an enclosure.

31. The billboard vehicle of claim 24, wherein each of said multi-display sign boxes further includes a liner disposed on a back side such that when viewed from a front side, vision between adjacent of said multi-sided display elements is prevented.

32. The billboard vehicle of claim 24, further including at least one lighting fixture mounted on said flat bed portion, said lighting fixture being configured to illuminate said at least one of said multi-display sign boxes.

33. The billboard vehicle of claim 24, further including a diesel generator secured to said flat bed portion and configured to supply operating power to said plurality of multi-display sign boxes.

34. The billboard vehicle of claim 24, further comprising a means for tracking a position of said vehicle.

35. The billboard vehicle of claim 24, further comprising a low power FM transmitter for transmitting advertising messages.

* * * * *